United States Patent
Wong et al.

(10) Patent No.: US 11,017,671 B2
(45) Date of Patent: May 25, 2021

(54) PRECAUTIONARY VISUAL PERCEPTION BY DETECTION OF REAR STOP LIGHT OF VEHICLE THAT IS TWO VEHICLES AHEAD

(71) Applicant: NIO USA, Inc., San Jose, CA (US)

(72) Inventors: Ming Fung Wong, San Jose, CA (US); Anqi Wang, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 303 days.

(21) Appl. No.: 16/025,692

(22) Filed: Jul. 2, 2018

(65) Prior Publication Data
US 2020/0005646 A1   Jan. 2, 2020

(51) Int. Cl.
| | | |
|---|---|---|
| *G08G 1/04* | (2006.01) | |
| *G08G 1/16* | (2006.01) | |
| *G06K 9/00* | (2006.01) | |
| *H04N 7/18* | (2006.01) | |
| *G08G 1/052* | (2006.01) | |
| *G06K 9/20* | (2006.01) | |

(52) U.S. Cl.
CPC ......... *G08G 1/166* (2013.01); *G06K 9/00805* (2013.01); *G06K 9/00825* (2013.01); *G08G 1/04* (2013.01); *G08G 1/163* (2013.01); *G06K 9/2063* (2013.01); *G08G 1/052* (2013.01); *H04N 7/18* (2013.01)

(58) Field of Classification Search
CPC .......... G08G 1/163; G08G 1/166; G08G 1/04; G08G 1/052; G08G 1/16; G06K 9/00805; G06K 9/00825; G06K 9/2063; H04N 7/18
USPC ...................................... 701/23, 24, 28, 117
See application file for complete search history.

(56) References Cited

U.S. PATENT DOCUMENTS

| | | | |
|---|---|---|---|
| 7,566,851 B2 | 7/2009 | Stein et al. | |
| 8,996,224 B1 | 3/2015 | Herbach et al. | |
| 9,286,520 B1 | 3/2016 | Lo et al. | |
| 9,827,956 B2 * | 11/2017 | Foltin | G08G 1/166 |
| 2014/0303829 A1 * | 10/2014 | Lombrozo | G01S 15/88 |
| | | | 701/23 |
| 2015/0120160 A1 * | 4/2015 | Foltin | B60T 8/171 |
| | | | 701/70 |

(Continued)

FOREIGN PATENT DOCUMENTS

WO   WO-2013083313 A1 *   6/2013 ........... G06K 9/2054

OTHER PUBLICATIONS

Integrating Dashcam Views through Inter-Video Mapping; Hsin-I Chen ; Yi-Ling Chen ; Wei-Tse Lee ; Fan Wang ; Bing-Yu Chen 2015 IEEE International Conference on Computer Vision (ICCV) (Year: 2015).*
Daytime Preceding Vehicle Brake Light Detection Using Monocular Vision; Hua-Tsung Chen;Yi-Chien Wu;Chun-Chieh Hsu; IEEE Sensors Journal; vol. 16, Issue: 1; IEEE Journal Article. (Year: 2016).*

(Continued)

*Primary Examiner* — Cuong H Nguyen
(74) *Attorney, Agent, or Firm* — Sheridan Ross P.C.

(57) ABSTRACT

Systems of an electrical vehicle and the operations thereof are provided. Systems and methods are provided to detect a braking next-to-last vehicle that may cause the last vehicle (the preceding vehicle) to collide with the next-to-last vehicle, panic brake, make a sudden lane change, or otherwise endanger a vehicle following the preceding vehicle. Automated means for computer based vision and detection of brake lights are provided for a next-to-last vehicle. Brake lights are identified; if illuminated to a sufficient level to indicate braking, systems of the operated vehicle are alerted; and appropriate responses may be deployed.

20 Claims, 15 Drawing Sheets

(56) References Cited

U.S. PATENT DOCUMENTS

| | | | | |
|---|---|---|---|---|
| 2015/0210275 | A1* | 7/2015 | Huberman | G05D 1/0088 |
| | | | | 382/104 |
| 2016/0041560 | A1* | 2/2016 | Pillai | B60W 30/165 |
| | | | | 701/26 |
| 2016/0209844 | A1* | 7/2016 | Lombrozo | B60W 30/09 |
| 2016/0283807 | A1* | 9/2016 | Ben Shalom | B60W 30/09 |
| 2017/0076396 | A1* | 3/2017 | Sudak | G07C 5/085 |
| 2018/0032076 | A1* | 2/2018 | Lombrozo | G01S 15/88 |
| 2018/0178781 | A1* | 6/2018 | Funk | B60W 30/08 |
| 2018/0194282 | A1* | 7/2018 | Wolterman | B60W 50/0097 |
| 2018/0275665 | A1* | 9/2018 | Chintakindi | G05D 1/0214 |
| 2019/0106099 | A1* | 4/2019 | Funk | B60W 10/30 |
| 2019/0206260 | A1* | 7/2019 | Pilkington | B60Q 1/44 |
| 2019/0271983 | A1* | 9/2019 | Lombrozo | G05D 1/0088 |
| 2020/0118430 | A1* | 4/2020 | Kaster | G08G 1/052 |
| 2020/0160627 | A1* | 5/2020 | Jeong | G07C 5/008 |
| 2020/0195833 | A1* | 6/2020 | Sivan | G06F 3/013 |
| 2020/0294401 | A1* | 9/2020 | Kerecsen | G05D 1/0287 |

OTHER PUBLICATIONS

Night-time Vehicle Detection Based on Brake/Tail Light Color; Thathupara Subramanyan Kavya;Erdenetuya Tsogtbaatar; Young-Min Jang;Sang-Bock Cho; 2018 International SoC Design Conference (ISOCC); IEEE Conference Paper. (Year: 2018).*

Research on Vehicle Taillight Detection and Semantic Recognition Based on Internet of Vehicle; Zhenzhou Wang et al.; 2018 International Conference on Cyber-Enabled Distributed Computing and Knowledge Discovery (CyberC); IEEE Conference Paper. (Year: 2018).*

Object detection and object tracking in front of the vehicle using front view camera; Juraj Ciberlin;Ratko Grbic;Nikola Teslić;MilošPilipović; 2019 Zooming Innovation in Consumer Technologies Conference (Zinc); IEEE Conference Paper. (Year: 2019).*

Autonomous tracking of vehicle rear lights and detection of brakes and turn signals; Akhan Almagambetov;Mauricio Casares; Senem Velipasalar; 2012 IEEE Symposium on Computational Intelligence for Security and Defence Applications; IEEE Conference Paper (Year 2012).*

* cited by examiner

PRECAUTIONARY VISUAL PERCEPTION BY DETECTION OF REAR STOP LIGHT OF VEHICLE THAT IS TWO VEHICLES AHEAD

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
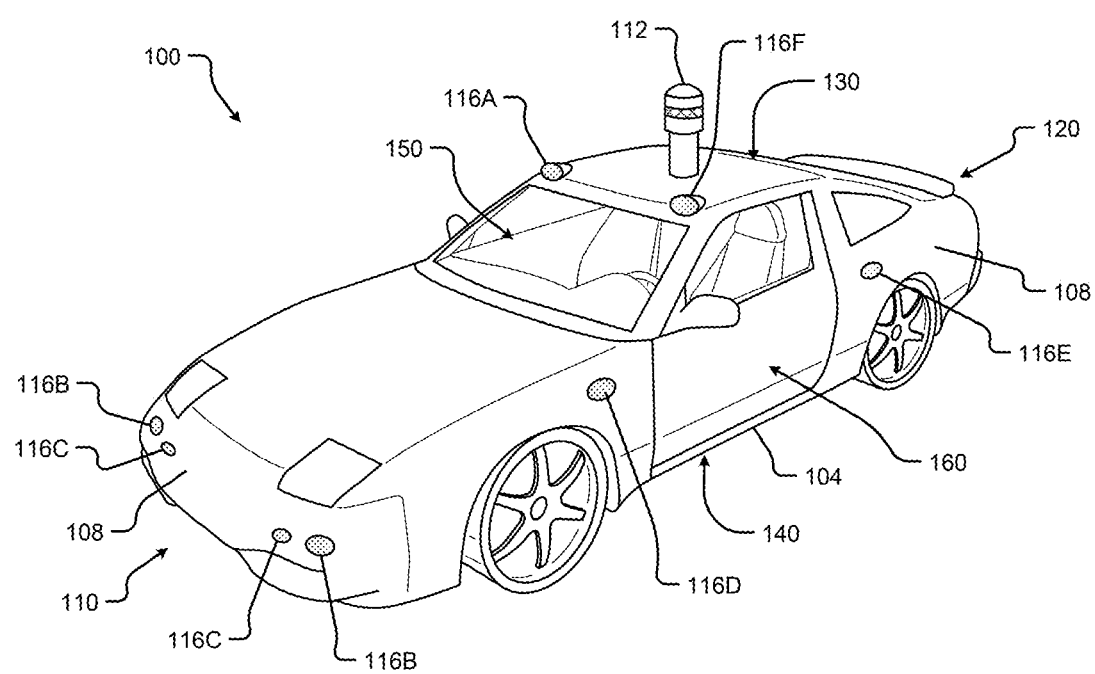
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
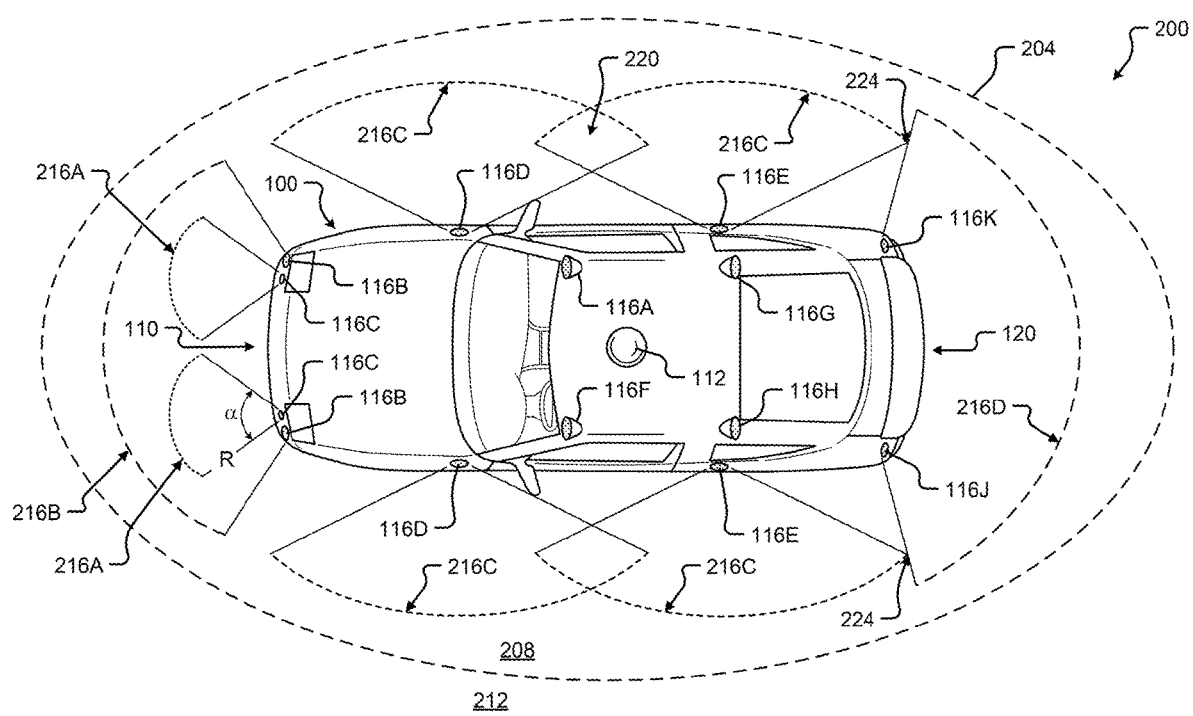
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
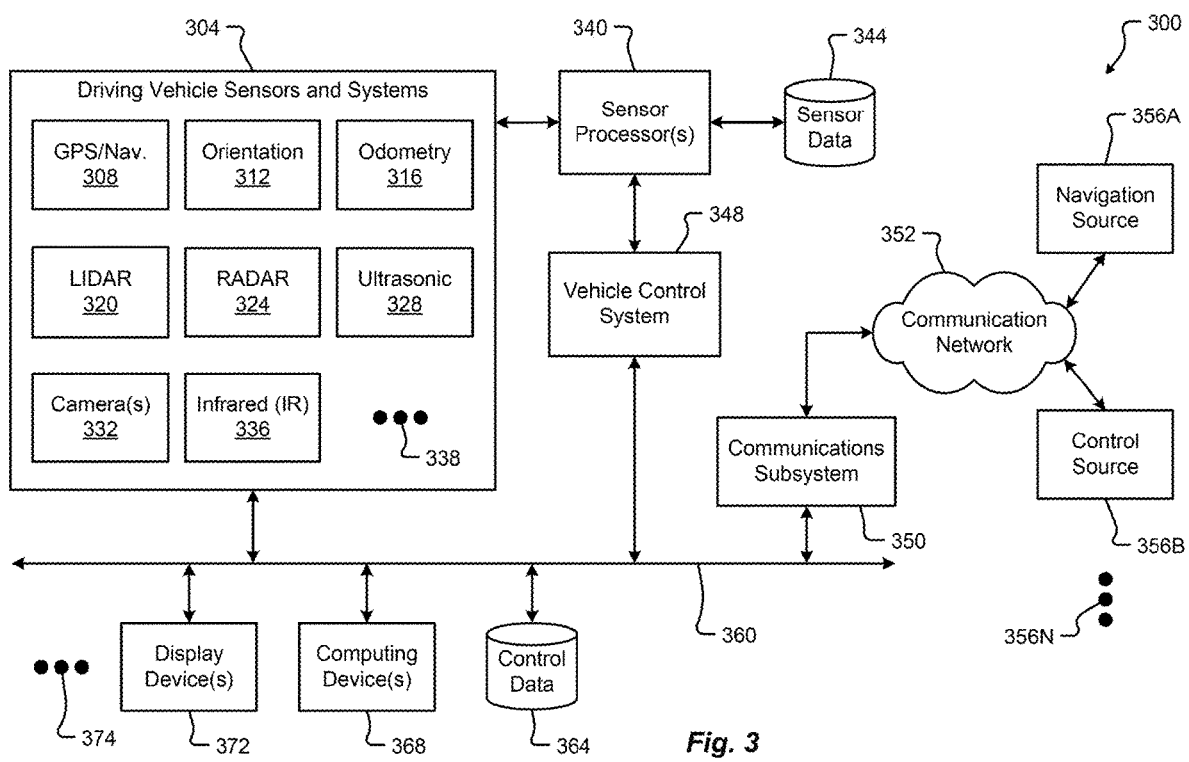
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
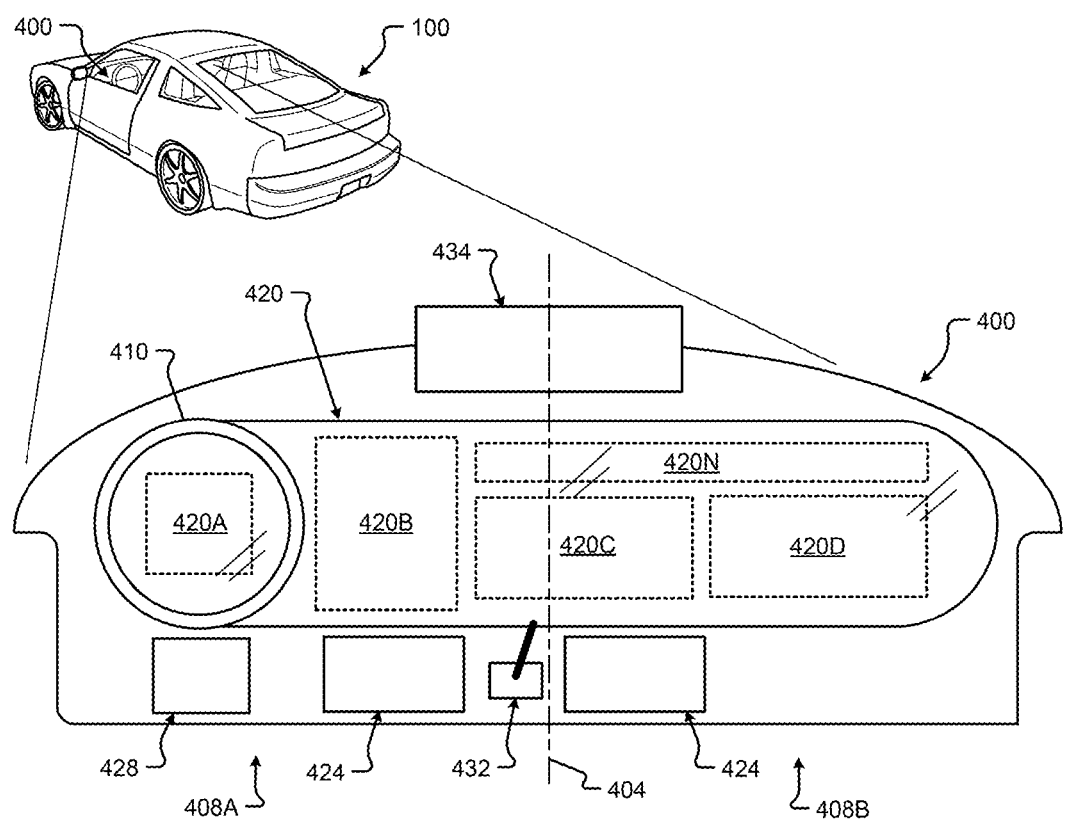
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
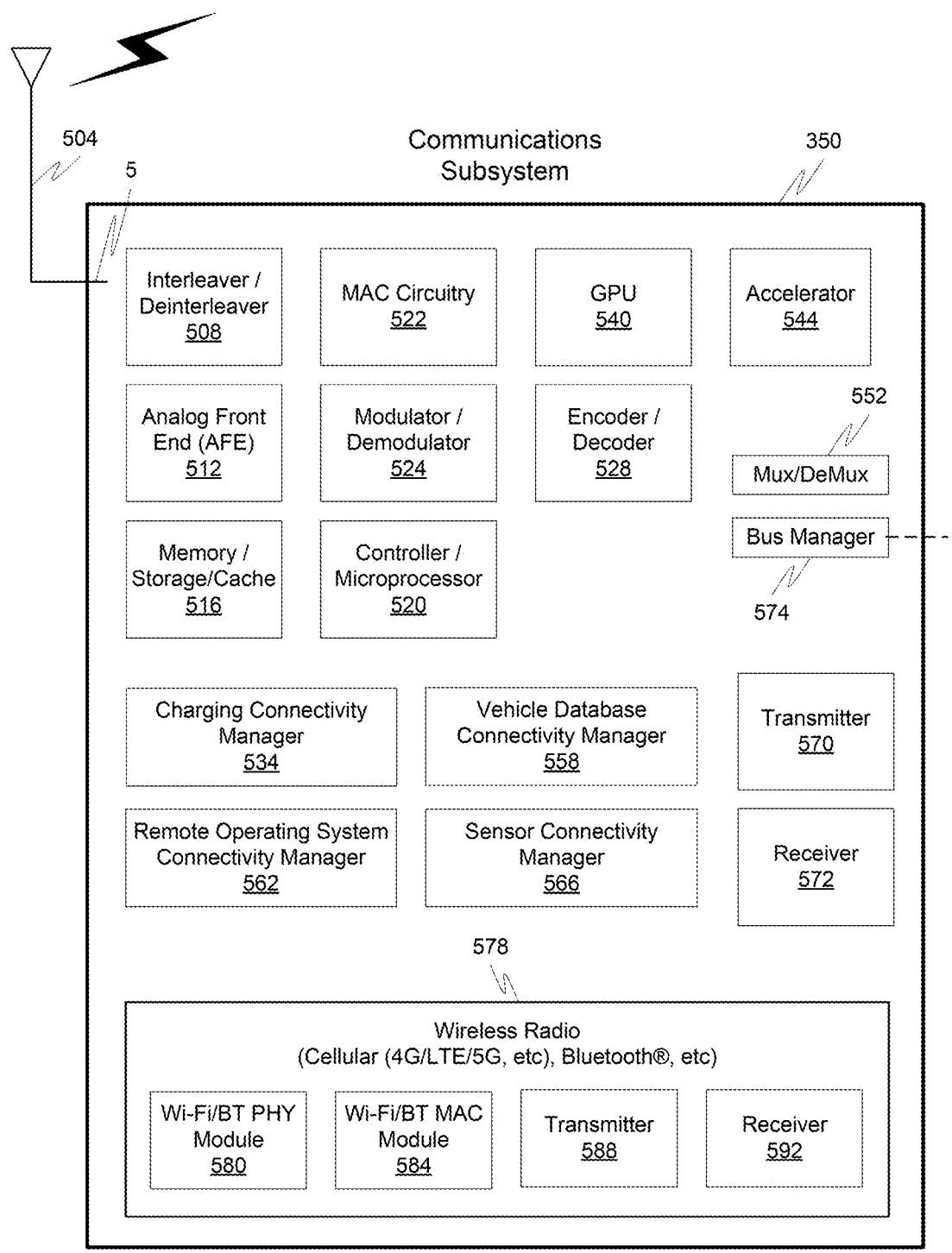
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
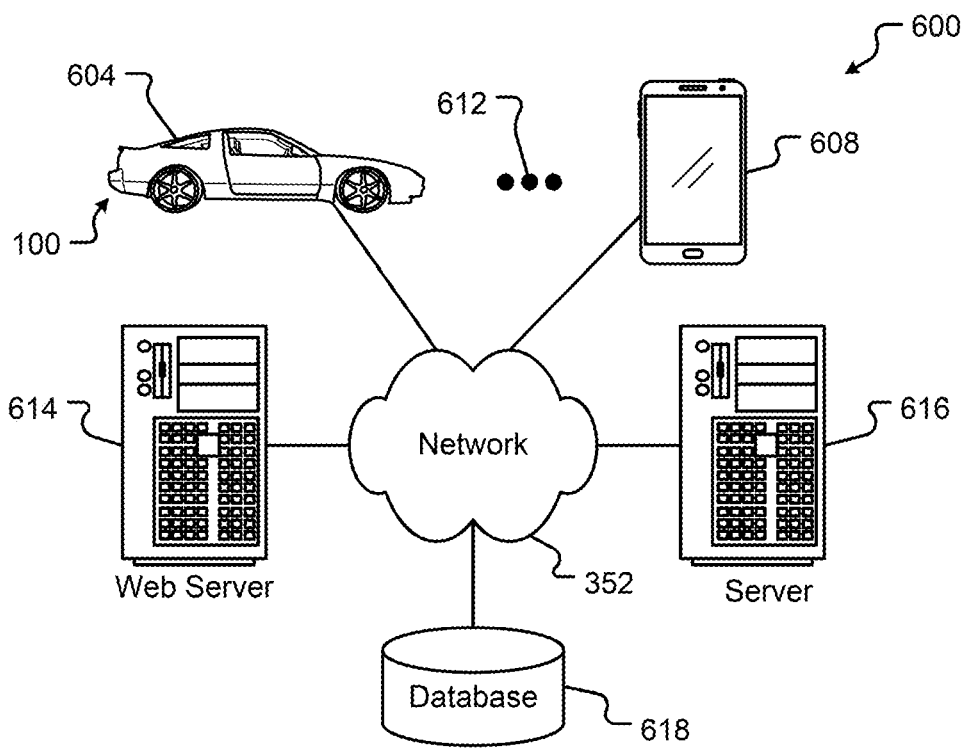
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
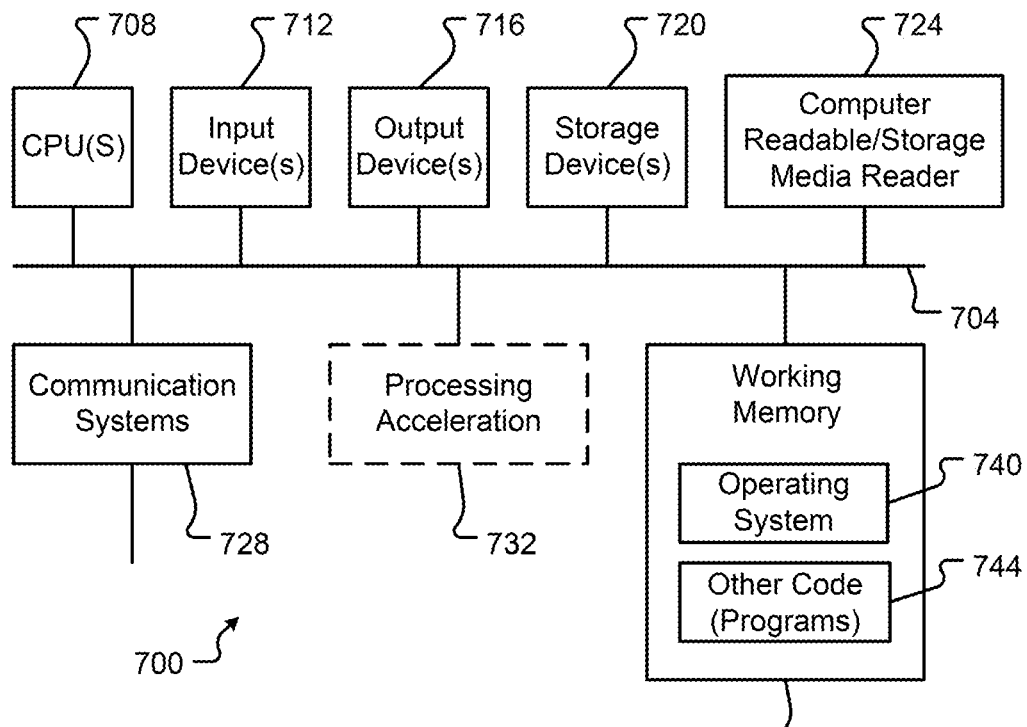
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments that follow are generally directed to an operated vehicle, such as vehicle 100, detecting, processing, and responding to a next-to-last vehicle that is braking. For clarity, it is assumed that the operated vehicle is third in a series, the second is the series is the preceding vehicle, and the first in the series is the next-to-last vehicle.

Figure 8:
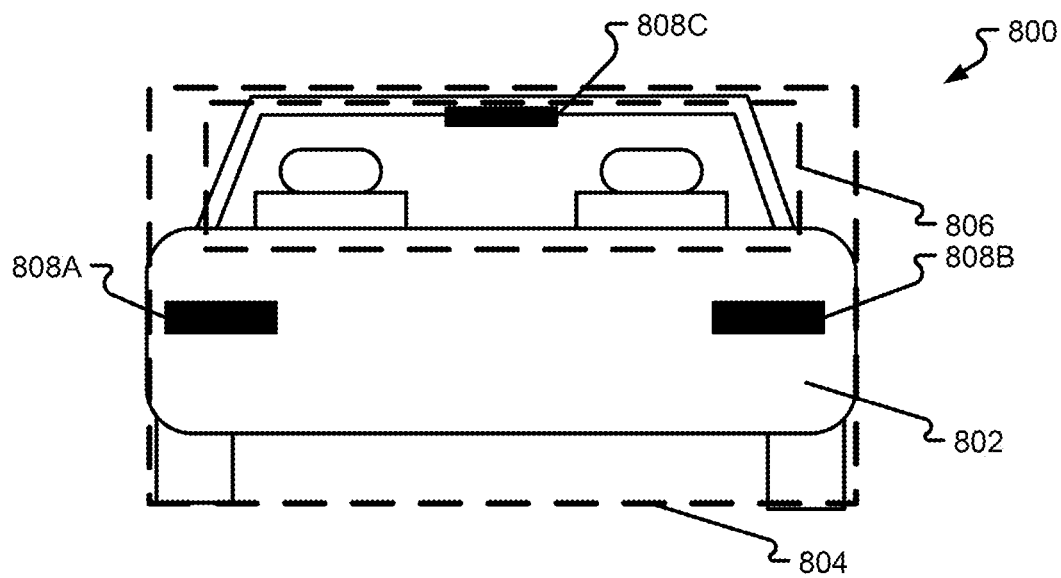
FIG. 8 shows an embodiment of a preceding vehicle in accordance with at least some embodiments of the present disclosure.

FIG. 8 shows image 800 of preceding vehicle 802 in accordance with at least some embodiments of the present disclosure. In one embodiment, vehicle 100 is configured with at least one imaging sensor 116 embodied as a camera. In a further embodiment, imaging sensor 116 is operational to capture real-time images in the visual spectrum including, but not limited to, red. Red is selected as it is the established color utilized for stop lights. It should be appreciated that the placement of imaging sensor 116 may be deployed in the exterior and/or interior of vehicle 100. In a further embodiment, image sensor 116 may comprise two or more image sensors 116, such as to provide other sensing types (e.g., microwave, infrared, etc.) and/or positions (e.g., stereoscopic, additional/alternative viewing locations, etc.). Imaging sensor 116 provides imaging signals to a processor, such as one or more CPU(s) 708. In one embodiment, imaging sensor 116 converts visual images into electrical signals, which are then provided, such as via bus 704, to CPU 708 for further processing. It should be appreciated that additional and alternative components may be utilized without departing from the scope of the embodiments provided herein. To promote clarity in understanding the embodiments, imaging sensor 116, when configured as a visual spectrum camera outputting electronic signals of images, is hereafter referred to as "camera 116." It should also be appreciated that, unless otherwise noted, preceding vehicle 802, next-to-last vehicle 902, and/or additional or other components illustrated with respect to FIGS. 8-11 refer to images as captured by camera 116. Accordingly, it should be understood that reference to, for example, preceding vehicle 802 is a reference to an image of preceding vehicle 802 captured by camera 116 and not to the physical vehicle itself.

In one embodiment, image 800 is captured by camera 116 of vehicle 100 and comprises preceding vehicle 802. Preceding vehicle 802 is further segmented into polygon 804 substantially identifying the area of image 800 comprising vehicle 100. See-through area 806 is further determined as a portion of polygon 804. Polygon 804 may be determined, such as based on available processing capacity of CPU 708 and/or other factors. For example, polygon 804 may be a rectangle, square, or other regular geometry. In other examples, polygon 804 may be an irregular geometry and more closely overlay the contours of the perimeter of preceding vehicle 802. See-through area 806 is a further segmentation of polygon 804. See-through area 806 may be an upper half of polygon 804. See-through area 806 may be further delimited to a subportion of the upper half of see-through area 806, such that a portion within the upper half of polygon 804 may not include see-through area 806. In another embodiment, a portion of see-through area 806 may extend left, right, and/or above the bounds of polygon 804. For example, due to a hill, camera 116 placement, curves, etc. see-through area 806 may be extended outside of preceding vehicle 802 as delimited by polygon 804.

In another embodiment, image 800 of preceding vehicle 802 comprises preceding vehicle brake light 808, which may further comprise preceding vehicle left brake light 808A, preceding vehicle left brake light 808B, and/or preceding vehicle (center high mount stop lamp (or light)) CHMSL brake light 808C. Embodiments provided herein may be utilized with other detection and response components and methods to alert an operator and/or other system, such as to engage braking when the vehicle immediately preceding vehicle 100 (e.g., preceding vehicle 802) brakes. However, preceding vehicle 802 may not be aware of a braking next-to-last vehicle and collide with the next-to-last vehicle or perform an abrupt maneuver, such as a sudden lane change, whereby vehicle 100 is now in risk of colliding with the next-to-last vehicle or have options (e.g., lane changes) unavailable for consideration, which is now directly preceding vehicle 100. Accordingly, detecting and processing of the braking of a next-to-last vehicle may provide an additional means of predicting the actions of preceding vehicle 802 and means to safely prepare and/or respond thereto.

Not every circumstance requires management. For example, the distance between vehicle 100 and preceding vehicle 802, in view of the road conditions, may be such that there is no risk to vehicle 100, even if preceding vehicle 802 were to collide with a next-to-last vehicle or abruptly change lanes to place vehicle 100 directly behind a stopped next-to-last vehicle. Known or suspected road conditions (e.g., ice, rain, snow, dry, etc.), vehicle 100 conditions (e.g., speed, under/overloaded, defective brakes, new tires, etc.) may be utilized to determine a margin of safety. For example, at speeds around forty miles-per-hour, there is little need for any action beyond basic navigation when preceding vehicle 802 is two-hundred feet ahead as, assuming good road and vehicle conditions, as normal stopping, lane changing, etc., will suffice if and when action needs to be taken, even in an extreme situation such as when preceding vehicle 802 has collided with a next-to-last vehicle and came to a sudden stop. However, normal driving modes of vehicle 100 may not assume any vehicle on the roadway is capable of coming to an abrupt stop. To do so would require additional following distance which may then get filled in with other vehicles which in turn requires additional following distance—a challenge that may make safe operation, or maintaining a desired speed in traffic, difficult if not impossible. Additionally, as roads become more congested, the adoption of fully or partially autonomous vehicles is likely to face resistance if such vehicles require a larger portion of the roadway to safely operate (e.g., assume any preceding vehicle may come to an instant stop).

Figure 9:
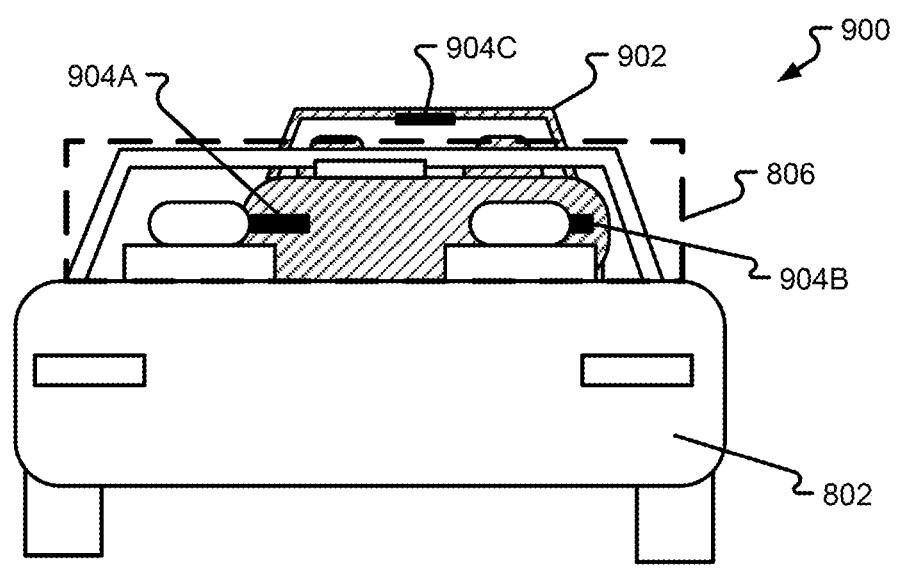
FIG. 9 shows an embodiment of a preceding vehicle and a next-to-last vehicle in accordance with at least some embodiments of the present disclosure.

FIG. 9 shows image 900 of preceding vehicle 802 and next-to-last vehicle 902 in accordance with at least some embodiments of the present disclosure. Preceding vehicle 802 may have visible within see-through area 806, next-to-last vehicle 902. Next-to-last vehicle 902 may have one or more brake lights. One brake light may be the result of a failure or prior damage or, certain vehicles (e.g., motorcycles), normal. Similarly, older vehicles may have been manufactured with only two brake lights and vehicles built with three lights (e.g., two close to the horizontal limits of the vehicle and one CHMSL) may have had one or two burned out or otherwise disabled. In the embodiment provided by image 900, next-to-last vehicle 902 has, at least partially visible, next-to-last vehicle brake light 904 comprising next-to-last vehicle left brake light 904A, next-to-last vehicle right brake light 904B, and next-to-last vehicle CHMSL brake light 904C. Upon detecting all next-to-last vehicle brake light 904 indicating a braking operation, vehicle 100 may respond accordingly (discussed more completely with respect to embodiments that follow). However, as vehicles move about the roadway, interior portions (e.g., occupants, seats, restraints, mirror, etc.) and/or exterior portions (e.g., roof; A, B, C, and/or D pillar; etc.) may obscure entirely or partially one or more of next-to-last vehicle brake light 904.

In one embodiment, if all or less than all of the next-to-last vehicle brake light 904 for a particular next-to-last vehicle 902 are presently visible, and those that are visible indicate braking (e.g., illuminated in a manner consistent with being activated during braking), next-to-last vehicle 902 may be determined to be braking. To rephrase, no next-to-last vehicle brake light 904 that is currently visible is indicating a non-braking state. However, if there is disagreement, such as when next-to-last vehicle right brake light 904B indicates braking and one or both of next-to-last vehicle left brake light 904A and/or next-to-last vehicle CHMSL brake light 904C do not indicate braking, next-to-last vehicle 902 may be determined to be not braking, such as may occur when signaling for a turn or lane change. This may be useful to avoid false-positives, such as when certain next-to-last vehicle 902 may utilize red turn signals co-located with the brake lights. Accordingly, a turn signal may indicate braking but be contradicted by other next-to-last vehicle brake light 904 and, as a result, conclude next-to-last vehicle 902 is not braking. In a further embodiment, next-to-last vehicle CHMSL brake light 904C may always indicate braking and whether or not any other brake lights, such as next-to-last vehicle left brake light 904A and/or next-to-last vehicle CHMSL brake light 904C are illuminated need not be considered. next-to-last vehicle brake light 904 may also indicate a hard stop. While presently deployed only on certain vehicles in Europe and as an after-market add-on in other countries, next-to-last vehicle CHMSL brake light 904C may flash, such as at 4 Hz, when next-to-last vehicle 902 has braked hard enough to engage anti-lock brakes or other condition to indicate aggressive braking and/or braking while above a predetermined speed. Accordingly, next-to-last vehicle 902 may be determined to be braking when such a signal is detected without requiring the need to consider other sources of information.

Figure 10A:
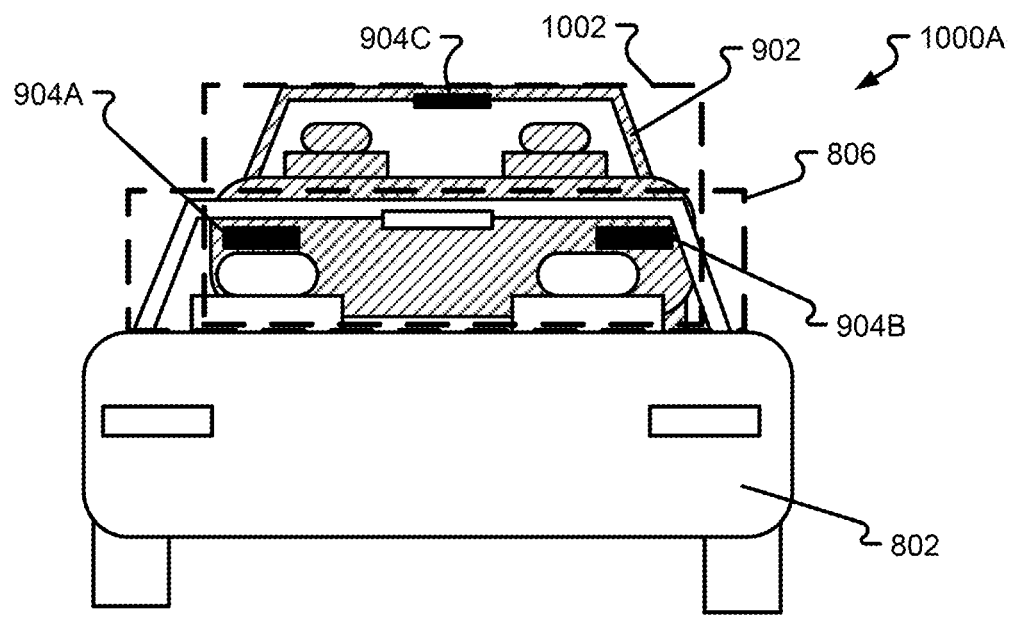
FIGS. 10A-B show an embodiment of a preceding vehicle and a next-to-last vehicle in a first position and a second position accordance with at least some embodiments of the present disclosure.
Figure 10B:
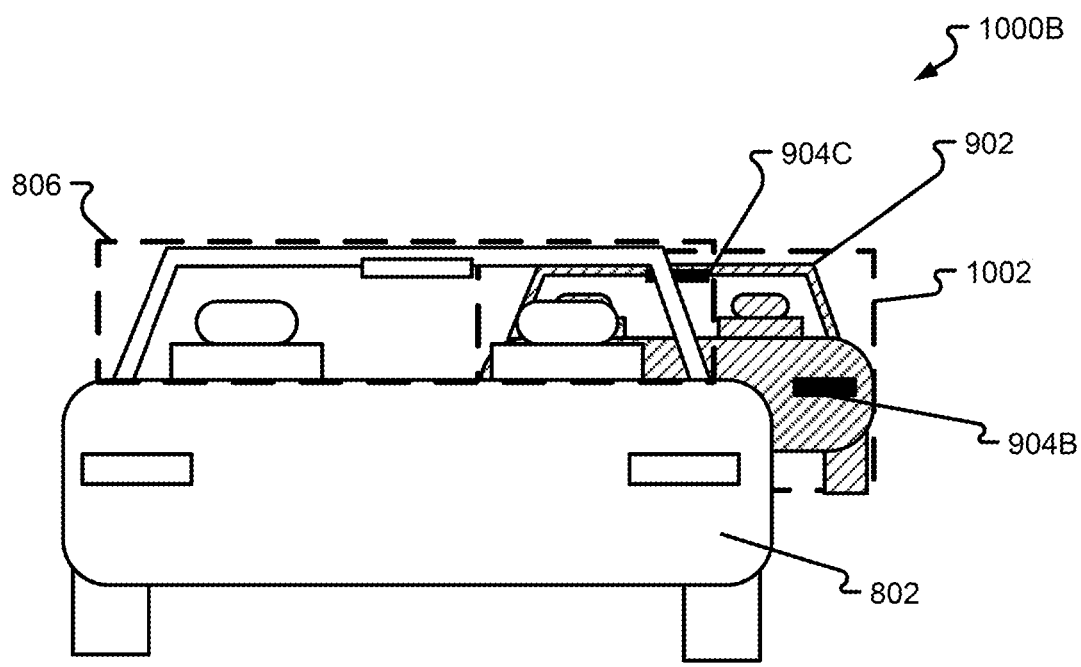

FIGS. 10A-B shows an embodiment of preceding vehicle 802 and next-to-last vehicle 902 in first position 1000A and second position 1000B in accordance with at least some embodiments of the present disclosure. As vehicles travel on a roadway, curves, lane changes, lane position, hills, dips, and other features and events will cause camera 116 to observe a change in the relative position of next-to-last vehicle 902 to preceding vehicle 802. In one embodiment, one or more processors, such as CPU(s) 708 creates a profile of next-to-last vehicle 902. CPU(s) 708 may optionally create a profile of preceding vehicle 802. A profile of a vehicle comprises, at least, the location and/or attributes of brake lights, such as next-to-last vehicle brake light 904 for next-to-last vehicle 902. The profile may segment an image into subportions (e.g., grid, coordinates, etc.) or other representations (e.g., outline) and identify the position of lights within the grid and/or via other location convention (e.g., vector, brake light outline, etc.). Accordingly, as a particular vehicle gains distance, the grid as a whole may be reduced, but the position of the brake lights maintained within the grid.

In another embodiment, a profile may be utilized by CPU(s) 708 to identify the position of next-to-last vehicle brake light 904 that may be presently obscured by preceding vehicle 802. For example, next-to-last vehicle left brake light 904A is visible in FIG. 10A, in first position 1000A, but obscured in FIG. 10B, in second position 1000B. Accordingly, CPU(s) 708 may then exclude next-to-last vehicle left brake light 904A from any determination of whether or not next-to-last vehicle 902 is braking. In another embodiment, next-to-last vehicle brake light 904 is now partially obscured. As a result, CPU(s) 708 may determine next-to-last vehicle CHMSL brake light 904C indicates braking if the luminosity and/or size of the illumination indicates braking for the level of partial visibility. For example, CPU(s) 708 may identify next-to-last vehicle CHMSL brake light 904C based upon position within next-to-last vehicle brake light 904 to determine a baseline (non-braking) value for next-to-last vehicle CHMSL brake light 904C. When braking the luminosity and/or area of next-to-last vehicle CHMSL brake light 904C increases. If next-to-last vehicle CHMSL brake light 904C is half obscured, then an increase in luminosity and/or area that is half the difference between the baseline value and the braking value may then be determined to be a braking event for next-to-last vehicle 902.

In another embodiment, a profile of next-to-last vehicle brake light 904 may be represented as polygon 1002, such as to substantially encompass the next-to-last vehicle 902 at the periphery thereof. Tracking polygon 1002 may provide a reduced processor demand on CPU(s) 708, as well as other advantages. For example, in position 1000A, with all three next-to-last vehicle brake light 904 visible, and then in position 1000B, with only next-to-last vehicle right brake light 904B fully visible and with next-to-last vehicle CHMSL brake light 904C partially visible, polygon 1002 may be maintained. Accordingly, should next-to-last vehicle left brake light 904A return to view (e.g., a return to position 1000A), CPU(s) 708 may expect such a return and avoid the need to create and/or update the profile for next-to-last vehicle 902.

Figure 11:
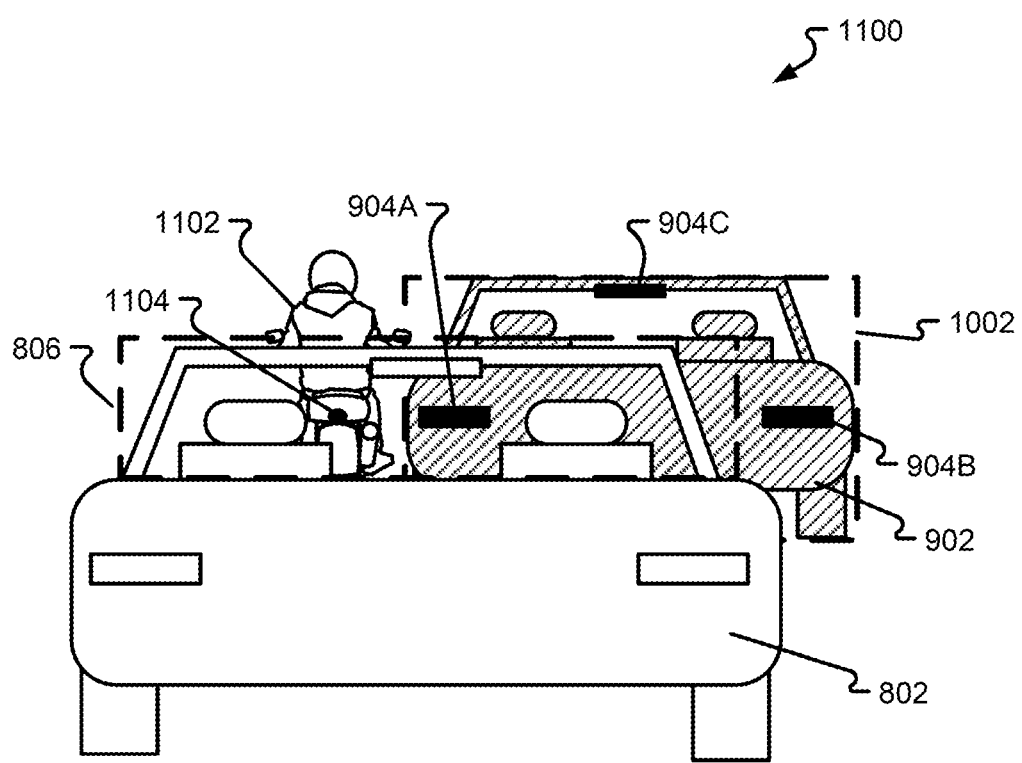
FIG. 11 shows an embodiment of a preceding vehicle, a next-to-last vehicle, and one other vehicle in accordance with at least some embodiments of the present disclosure.

FIG. 11 shows an embodiment of preceding vehicle 802, next-to-last vehicle 902, and one other vehicle 1102 in accordance with at least some embodiments of the present disclosure. other vehicle 1102 may visually enter see-through area 806. Other vehicle 1102 may have other vehicle brake light 1104, which may be, at least at one point, detected by camera 116. While other vehicle 1102 is illustrated as a motorcycle having one brake light (other vehicle brake light 1104), in other embodiments other vehicle 1102 may be different type of vehicle or trailer, such as a car, truck, flatbed, or a portion thereof.

In one embodiment, CPU(s) 708 may create a separate profile for other vehicle 1102 and consider both other vehicle 1102 and/or next-to-last vehicle 902 as next-to-last vehicles for consideration of wither such a next-to-last vehicle is braking. In another embodiment, other vehicle 1102 may be determined to be irrelevant and only next-to-last vehicle brake light 904 within polygon 1002 are considered, such as by a profile created for next-to-last vehicle 902.

Figure 12:
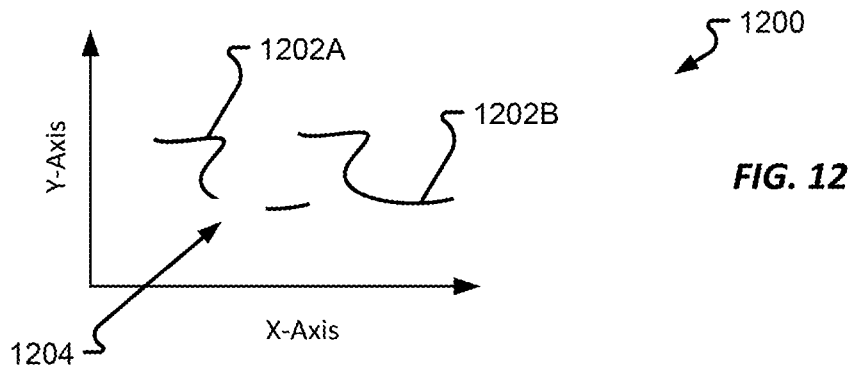
FIG. 12 shows a first brake light position plot in accordance with at least some embodiments of the present disclosure.

FIG. 12 shows brake light position plot 1200 in accordance with at least some embodiments of the present disclosure. In one embodiment, brake lights may be plotted, such as relative to see-through area 806, next-to-last vehicle 902, and/or polygon 1002. In one embodiment, traces 1202A-B represent two brake lights, such as next-to-last vehicle left brake light 904A and next-to-last vehicle right brake light 904B. The vehicle producing traces 1200 may only have two brake lights or may only have two brake lights visible to camera 116 during the time plot 1200 occurred. Gap 1204 may occur as the brake light producing trace 1202A becomes obscured, such as by a seat or other component of a preceding vehicle, such as preceding vehicle 802.

Traces 1202 may occur after a profile for the next-to-last vehicle has been created. In another embodiment, traces 1202 may occur as a trace of red points within an image that are candidate locations for brake lights. Traces 1202A and 1202B appear to be substantially duplicate images of each other indicating that the movement of the lights creating each of 1202A and 1202B are likely attached the same vehicle. As a result, a profile may be created or updated to include the points with the image identifying traces 1202A and 1202B.

Figure 13:
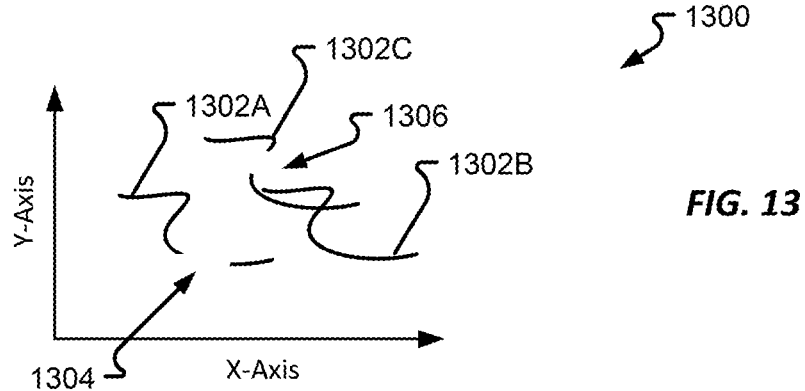
FIG. 13 shows a second brake light position plot in accordance with at least some embodiments of the present disclosure.

FIG. 13 shows brake light position plot 1300 in accordance with at least some embodiments of the present disclosure. In one embodiment, three traces 1302A, 1302B, and 1302C are created and are substantially duplicates of each other but position-shifted. Accordingly, each of traces 1302A, 1302B, and 1302C may be determined to be associated with a single vehicle. Gaps 1304 and/or 1306 may result from obscuring lights during the time plot 1300 was created. As three traces 1302 are created with one, trace 1302C, in substantially the middle between and above traces 1302A and 1302B, a profile for such a vehicle may be created and/or updated to include three brake lights, such as next-to-last vehicle left brake light 904A, next-to-last vehicle right brake light 904B, and next-to-last vehicle CHMSL brake light 904C.

Had any one of traces 1302 diverged relative to any other trace 1302, CPU(s) 708 may conclude that more than one vehicle is producing traces 1302. If one, and only one, of traces 1302 diverged from two other of traces 1302, and the other two traces 1302 did not diverge relative to each other, the non-diverging traces of 1302 may be determined to be from one vehicle and the diverging trace 1302 from another vehicle. In another embodiment, gaps (e.g., gaps 1204 of FIG. 12, 1304, 1306) may be utilized to profile a preceding vehicle and obscuring portions thereof.

Figure 14:
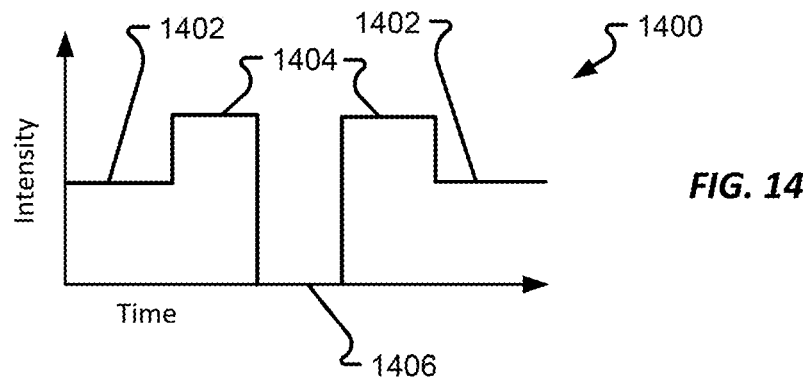
FIG. 14 shows a first brake light intensity plot in accordance with at least some embodiments of the present disclosure.

FIG. 14 shows brake light intensity plot 1400 in accordance with at least some embodiments of the present disclosure. In real-world environments, brake lights may have a luminosity that indicates braking when the associated vehicle is not braking. For example, a perioding flashing may be a turn signal, a glint of light may be a reflection, a luminosity may be a tail light illuminated for night driving, etc. In one embodiment, plot 1400 illustrates baseline intensity 1402, such as when tail lights are illuminated and peaking at portions 1404. In other environments, such as day driving, the red lens or cover of a brake light may produce baseline 1402 when not braking. A change in luminosity from baseline 1402 to peak 1404 may be determined to be an activation of the associated brake light producing plot 1400 and, as a result, the vehicle being in a braking mode.

In another embodiment, gap 1406 may coincide with a portion of a preceding vehicle (e.g., seat, occupant, etc.) that obscured the light producing plot 1400. When gap 1406 does coincide with an obscuring component, CPU(s) 708 may extrapolate to conclude that, although obscured, the brake light producing plot 1400 was illuminated during gap 1406 and would have produced peak 1404 during gap 1406 if it were not obscured. However, if gap 1406 does not coincide with an obscuring portion, CPU(s) 708 may determine the brake light producing plot 1400 was not illuminated. Whether a brake light was or was not obscured may also be determined by the difference between baseline 1402 and gap 1406. As gap 1406 is less than baseline 1402, then the brake light may be determined to be obscured as a non-braking, but visible brake light should have produced baseline 1402 luminosity.

Figure 15:
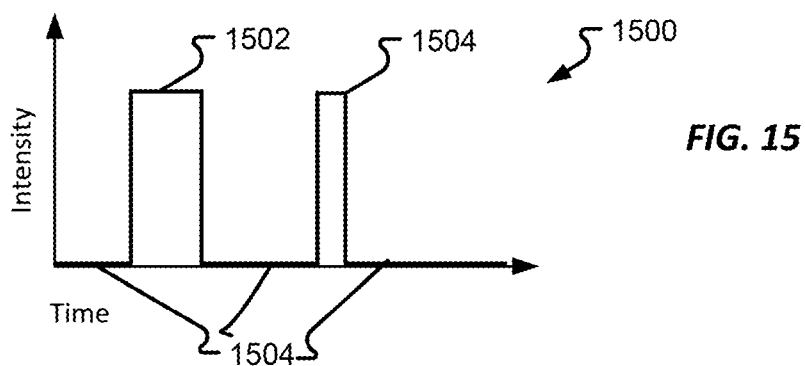
FIG. 15 shows a second brake light intensity plot in accordance with at least some embodiments of the present disclosure.

FIG. 15 shows brake light intensity plot 1500 in accordance with at least some embodiments of the present disclosure. In one embodiment, see-through area 806 may comprise tinted or "privacy" glass such that next-to-last vehicle brake light 904 are not visible or are only marginally visible unless illuminated, such as during braking. A profile of next-to-last vehicle 902 may be created, such as when next-to-last vehicle 902 appears beyond the limits of preceding vehicle 802 and/or beyond the limits of see-through area 806. As a result, an expected location of one or more next-to-last vehicle brake light 904 may be determined. Baseline values 1504, when within a tinted portion of see-through area 806 may be zero or near zero, but spike, such as during peaks 1502 and 1504 when next-to-last vehicle 902 is braking.

It should be appreciated that plots 1400 and/or 1500 may be restricted to light within the red portion of the visible spectrum (the known color of brake lights). Lights of other color (e.g., while, amber, etc.) may be excluded as they are known not to indicate braking.

Figure 16:
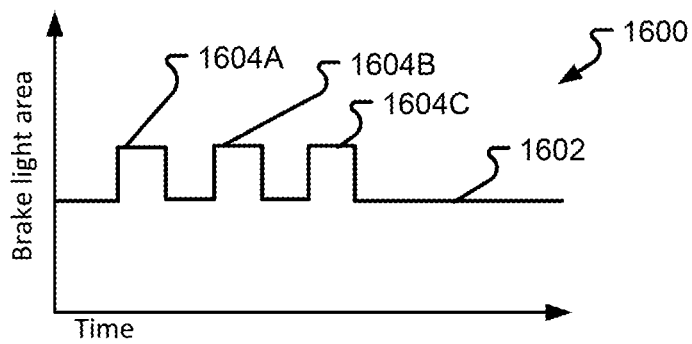
FIG. 16 shows a first brake area plot in accordance with at least some embodiments of the present disclosure.

FIG. 16 shows brake area plot 1600 in accordance with at least some embodiments of the present disclosure. In one embodiment, the intensity (or luminosity) of a brake light is utilized to determine the associated vehicle is braking. In another embodiment, the area of the illuminated portion of the brake light is utilized to determine the associated vehicle is braking. In yet another embodiment, the combination of intensity (or luminosity) and area of a brake light is utilized to determine the associated vehicle is braking luminosity. Plot 1600 illustrates one brake light, such as one of next-to-last vehicle brake light 904, and a change in illuminated area. The area of illumination may alter due to one portion of the tail light being illuminated, such as a tail light during night conditions. Other lights may indicate turns with altering sizes of the brake light area and, therefore, need to be excluded from consideration as a braking mode.

In plot 1600, peaks 1604A, 1604B, and 1604C are illustrated as having a greater area over baseline area 1602. In another embodiment, the size and period of peaks 1604 may be used alternatively or in addition to the change in area to determine if the brake light is indicating braking or turning. In another embodiment, the peaks may be increasing in a series (e.g., Ford Mustang, Mercury Cougar, etc.) to indicate turns and, when recognized, may be identified as not a braking indication.

Figure 17:
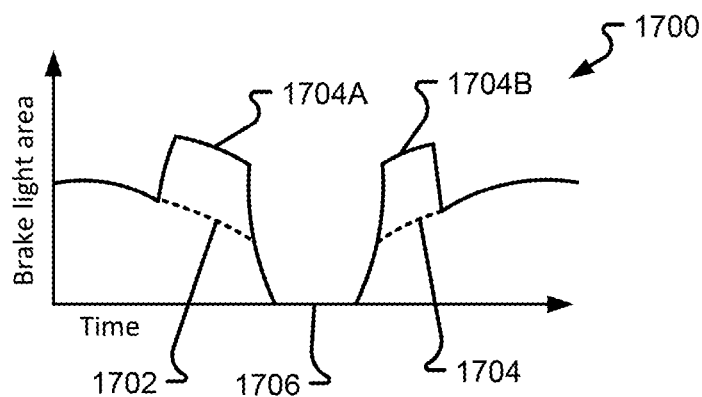
FIG. 17 shows a second brake area plot in accordance with at least some embodiments of the present disclosure.

FIG. 17 shows brake area plot 1700 in accordance with at least some embodiments of the present disclosure. Plot 1700 illustrates curves 1702 and 1704 which may be determined to be a baseline brake light area. The areas may not be constant (e.g., represented as a horizontal line a graph) due to conditions observed while in motion (e.g., turns, partial or complete blockage, etc.). Peaks 1704A and 1704B over baseline curves 1702 and 1704, respectively illustrating an increase in brake illumination area may be determined to indicate braking. Gap 1706 may coincide with an obscuring portion of a next-to-last vehicle, such as preceding vehicle 802. When such a determination is made, the light creating plot 1700 may be determined to be braking from the start of peak 1704A to the end of peak 1704B.

Figure 18:
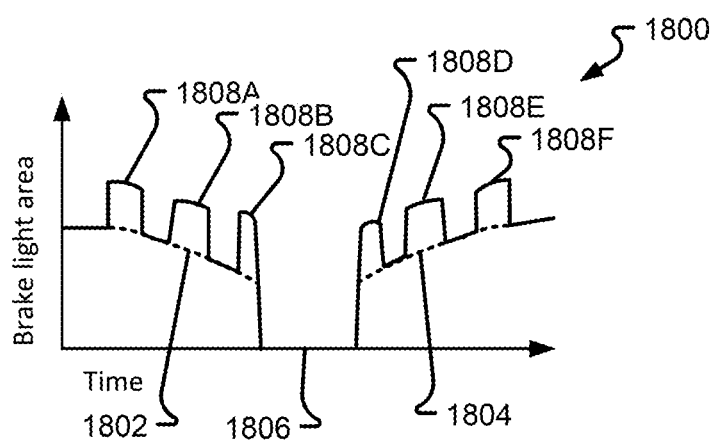
FIG. 18 shows a third brake area plot in accordance with at least some embodiments of the present disclosure.

FIG. 18 shows brake area plot 1800 in accordance with at least some embodiments of the present disclosure. Plot 1800 illustrates periodic peaks 1800 over baseline curves 1802 and 1804. Here to, real-world roadway conditions may cause the area to vary subtly, and produce a curving lines. Gap 1806, which falls below baseline curves 1804 may be determined to be the result of an obstruction. Other means of detecting obstructions, as discussed above, may also be utilized.

Figure 19A:
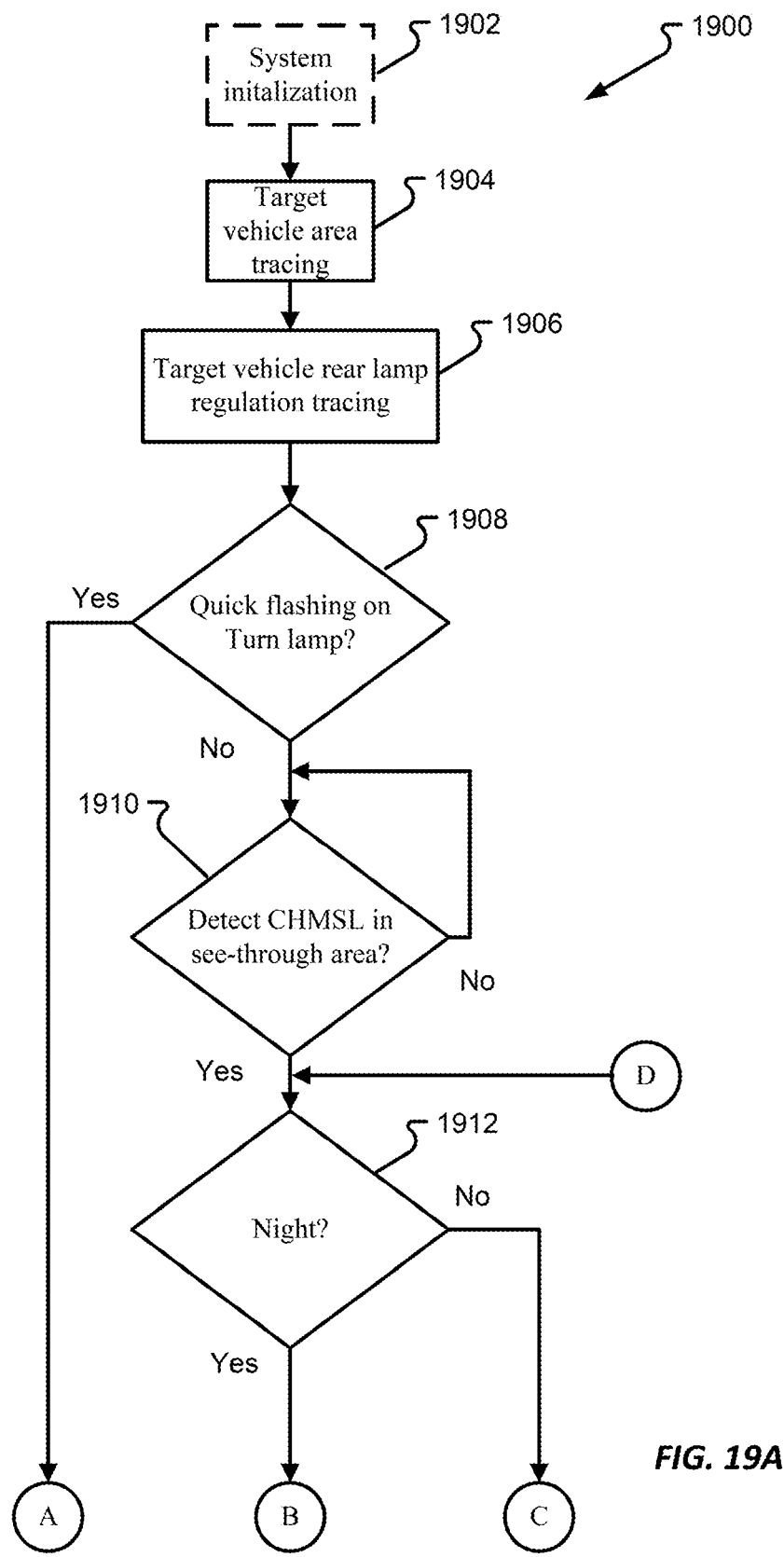
FIGS. 19A-B show a first process in accordance with at least some embodiments of the present disclosure.
Figure 19B:
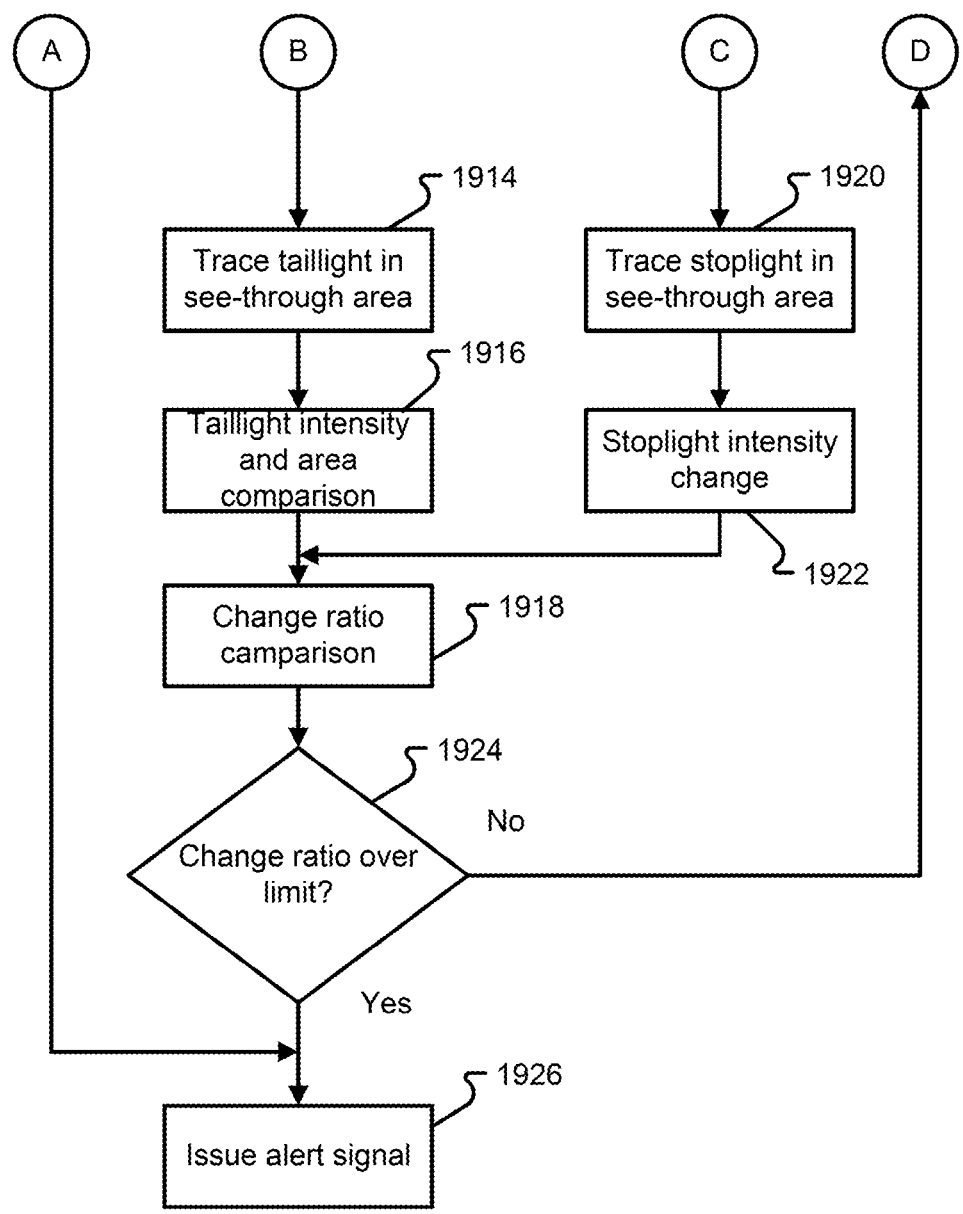

FIGS. 19A-B show process 1900 in accordance with at least some embodiments of the present disclosure. In one embodiment, process 1900 is performed by one or more of CPU(s) 708 or a portion thereof, in communication with camera 116. Additional components may also be utilized. Initially, optional step 1902 performs system initializations, which may include handshakes and other communication checks with components, such as imaging sensor 116 (camera 116), and/or other components. Step 1902 may perform alignment and/or otherwise ensure operational parameters are within an acceptable state for use. Step 1902 may provide environmental factors such as time of day (day mode, night mode, dusk, dawn, etc.), road conditions (e.g., dry, wet, icy, asphalt, cement, etc.), traffic conditions (smooth, stop-and-go, etc.) for a particular route or location, vehicle conditions (e.g., worn tires, new brakes, overloaded, etc.) and/or other condition that may affect detecting and determining whether or not a vehicle is braking and responses thereto (e.g., add additional braking time to safely stop, execute a sudden lane change only to avoid an imminent collision, etc.). Step 1902 may also determine the position of camera 116 within vehicle 100 (e.g., center, off-center, height above roadway, etc.) and whether camera 116 is mono or stereoscopic in order to better determine where a vehicle, captured by camera 116, is in real space. Additionally, step 1902 may configure CPU(s) 708 to utilize additional imaging sensor 116 beyond a camera and/or other components of vehicle 100 for data input (e.g., LIDAR, GPS, etc.). For example, when approaching a known stop sign, CPU(s) 708 may utilize a lower threshold of luminosity and/or area of a red portion of an image for detection of a brake light—as it is likely the next-to-last vehicle will be braking for the stop sign. In contrast, open freeway driving may require a higher threshold as braking occurs less often.

Step 1904 determines a target area for tracking. In one embodiment, a next-to-last vehicle, such as next-to-last vehicle brake light 904 is identified in see-through area 806 of preceding vehicle 802. A polygon, such as polygon 1002, delineates the image of next-to-last vehicle 902 with sufficient accuracy. For example, a rectangle substantially delineating the periphery of next-to-last vehicle 902 may be sufficient. In other embodiments, more than four segments and/or curved segments may be utilized as at least a portion of the polygon. A centroid or other portion of the polygon may be utilized as a tracking point whether visible or extrapolated through visible portions of the polygon.

Step 1906 determines the location of the brake lights. The position of brake lights is regulated, but due to vehicle variations (cars, trucks, motorcycles, etc.) the position, and relative position upon a tracked vehicle, may vary. However, brake lights are always red (unless the red color is the result of a while bulb or LED utilized with a red lens that is currently absent or broken). Certain areas of a polygon may be likely or unlikely to have stop lights. For example, segmenting a vehicle (or polygon overlaying the periphery of a vehicle) into an upper half and a lower half, one would expect to find brake lights approximately at the line of segmentation near each of the horizontal limits of the segmentation. A third (CMHSL) brake light may be present and, if so, would be located along a vertical segmentation of the left and right halves and within the upper segmentation. The occurrence of red that moves with the vehicle is then likely to be a brake light and tracking may then be utilized thereon.

In test 1908, a quick flashing is determined. If determined in the affirmative, processing continues to step 1926. If determined in the negative, processing may continue to step 1910. Quick flashing may be provided as a definitive indication of braking. In step 1910 the CHMSL may be detected for the next-to-last vehicle, such as next-to-last vehicle CHMSL brake light 904C, if not, looping of step 1910 may occur until such time as step 1910 is determined in the affirmative. If step 1910 is determined in the affirmative, processing continues to step 1912 wherein if the current conditions are night, step 1912 is determined the affirmative and processing continues to step 1914. If step 1912 is determined in the negative, processing continues to step 1920.

In step 1914, the taillight areas (illuminated due to night driving conditions) are traced. Step 1916 identifies the changes in intensity and/or area. In step 1920, the stoplight area is traced. Step 1922 observes a change in stoplight intensity. A ratio of the baseline intensity (and/or illumination area) to the change in intensity (and/or illumination area) is determined in step 1918. Step 1924 determines if the change is over a previously determined limit. The limit is selected statically or dynamically to minimize the occurrence of false positives (e.g., glints or other reflections) incorrectly being determined as a braking indication, versus the missing of an actual braking indication. If step 1924 is determined in the affirmative step 1926 is executed to provide an alert signal indicating that the next-to-last vehicle is braking. If step 1924 is determined in the negative, processing may continue back to step 1912.

It should be appreciated that portions of process 1900 may be executed continually and optionally independently of other steps, such as steps 1914 through 1926 and steps 1920 through steps 1926 may execute continually while test 1912 may be performed less frequently. In another embodiment, alert signal 1926 may energize a tone, alarm, visual indicator, shaker, or other component designed to draw the attention of an operator of vehicle 100 to the events preceding vehicle 100. Alternatively or additionally, the signal provided by step 1926 may be provided to another component, such as to discontinue acceleration, prepare for or perform a lane change, apply brakes, perform pre-collision activities (e.g., tension seat belts), etc.

Figure 20:
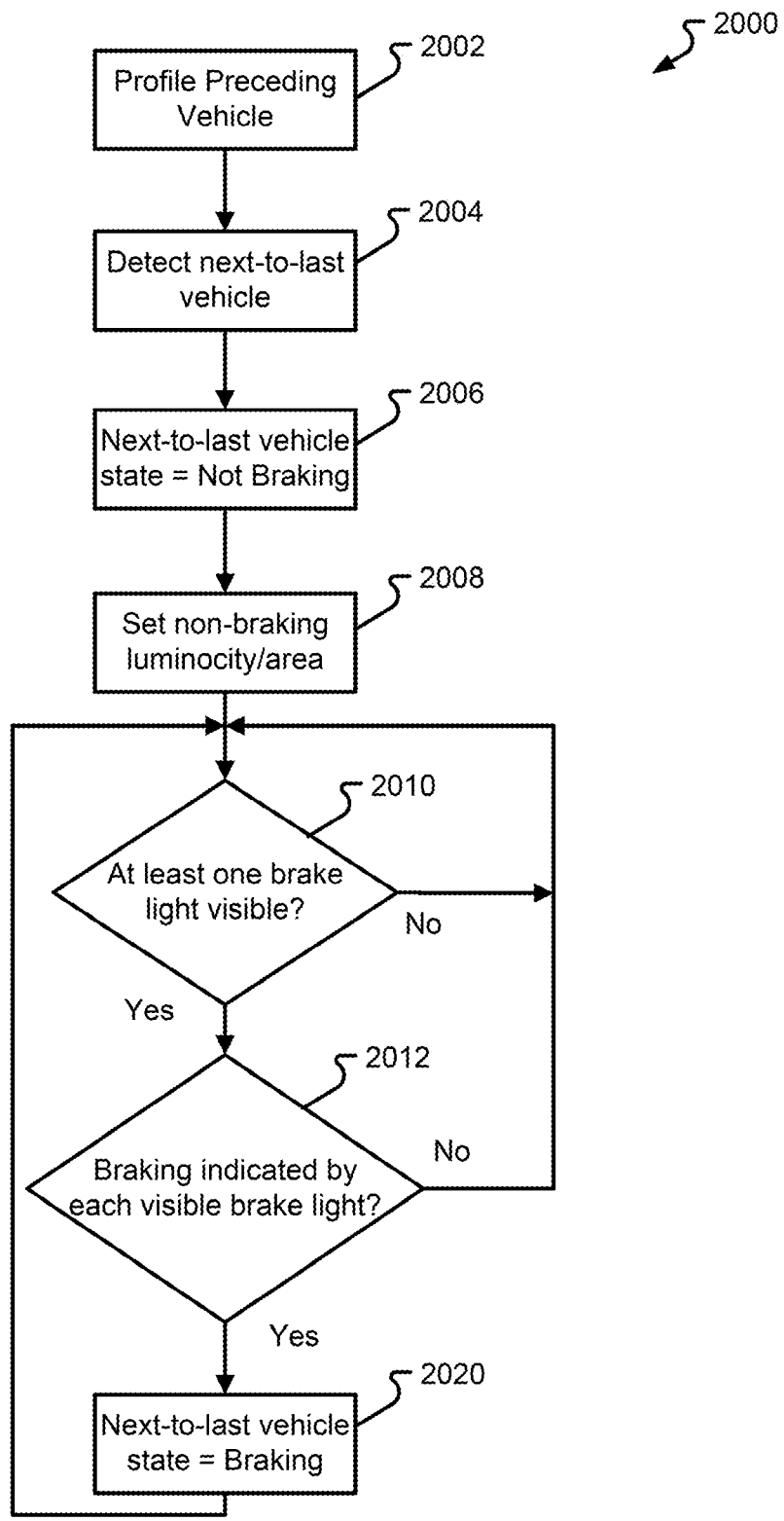
FIG. 20 shows a second process in accordance with at least some embodiments of the present disclosure.

FIG. 20 shows process 2000 in accordance with at least some embodiments of the present disclosure. In one embodiment, step 2002 profiles a preceding vehicle, such as preceding vehicle 802. Step 2002 may be utilized to identify portions of an image that apply to the preceding vehicle, and may be processed by other systems, versus other components that are not portions of the preceding vehicle. For example, a see-through area may be determined, such as see-through area 806, which may comprise preceding vehicle CHMSL brake light 808C, which may be visually proximate to the brake lights of a next-to-last vehicle as observed by camera 116. Having knowledge of such a feature of the preceding vehicle may better remove it from consideration as a portion of the next-to-last vehicle.

Step 2004 detects a next-to-last vehicle, such as next-to-last vehicle 902. Optionally, a profile may be created, such as to identify the position, number, and/or baseline luminosity/area of such brake lights. Step 2006, when next-to-last vehicle is determined not to be braking may set a state to a non-braking state. Step 2008 may then set a mode for the next-to-last vehicle as not braking. The next-to-last vehicle may have taillights illuminated, such as during night conditions, that may be utilized as the baseline luminosity and/or area. Alternatively, next-to-last vehicle may have taillights not illuminated, such as during daylight conditions, that may be used as the baseline luminosity and/or area.

Process 2000 may then execute a loop comprising steps 2010, 2012, and 2020. In step 2010, a test is executed to determine if at least one brake light is visible. If step 2010 is determined in the negative, step 2010 may loop back to itself. If step 2010 is determined in the affirmative, step 2012 determines if the brake lights from each visible brake light indicate braking. If each of a plurality of visible brake light disagree (e.g., at least one indicates braking and at least one does not indicate braking), processing may continue back to step 2010 as the next-to-last vehicle may be signaling for a turn or other non-braking activity. If step 2012 is determined in the affirmative, processing may continue to step 2020 whereby the braking state of the next-to-last vehicle is set to braking. Process 2000 may be executed in parallel with process 2100.

Figure 21:
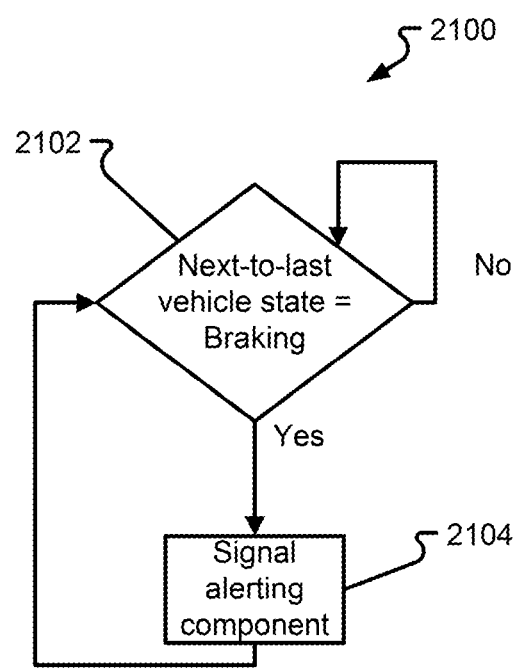
FIG. 21 shows a third process in accordance with at least some embodiments of the present disclosure.

FIG. 21 shows process 2100 in accordance with at least some embodiments of the present disclosure. In one embodiment, process 2100 loops continually while vehicle 100 is operating. In step 2102 a determination is made as to the braking state of the next-to-last vehicle, such as may be set in step 2006 and/or step 2020 of process 2000 (see FIG. 20). While step 2102 is determined in the negative, processing loops back to step 2102. If step 2102 is determined in the affirmative, processing continues to step 2104. Step 2104 may then energize a signal to component utilized to alert a human operator of vehicle 100 and/or alert an automated component of vehicle 100, such as to cause vehicle 100 to discontinue acceleration or perform other action.

In another embodiment, a state may be determined from a current or baseline state, such as one that indicates braking and then changed, (e.g., braking to not braking) and processed accordingly. For example, process 200 may be modified, such as the profiling provided by step 2002 may modified to determine a current or baseline intensity indicating breaking. Accordingly, step 2006 may be modified to set the next-to-last vehicle state to "braking." Step 2008 may then be modified to set a braking luminosity/area. Step 2012 may then be modified to determine if non-braking is subsequently indicated by each visible brake light and, if yes, step 2020 executed, which is modified to set the next-to-last vehicle state to "not braking."

Accordingly, process 2100 may then be modified, such that step 2102 tests whether the next-to-last vehicle state is not braking and, if yes, performs step 2104, which is modified to signal the alerting component that the braking has been discontinued.

It should be appreciated that while processes 2000 and 2100 test for certain values, such as provided in steps 2012 and 2102, testing for a change in the state is also contemplated. For example, test 2012 may test whether a current brake lights state is different from a previous brake light state, and then notify the alerting component accordingly, is also contemplated. Similarly, the alerting component may have an energized state and a non-energized state, which upon receiving a state change signal, then changes the current energized/non-energized state accordingly.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle with enhanced collision avoidance features, comprising: a camera configured to capture real-time images ahead of the direction of travel of the vehicle and convert the real-time images into a corresponding output of electrical signals; a processor, receiving the electrical signals from the camera, and having a memory for the storage of instructions for execution by the processor; and a communication interface enabling the processor to communicate with the camera and one or more other components of the vehicle; wherein the processor: determines at least one visible brake light of the next-to-last vehicle is present in a see-through area of the preceding vehicle, wherein the at least one visible brake light is visible to the camera; compares a current intensity of the at least one visible brake light to a baseline intensity, wherein the baseline intensity is associated with a non-braking state; and upon the comparison indicating the at least one visible brake light indicates braking of the next-to-last vehicle, outputs, on the communication interface, an alert signal energizing an alerting component of the vehicle.

Embodiments also include a method for improved vehicle safety equalizing a camera capturing images in the direction-of-travel, wherein a processor coupled to the camera performs: identifying a see-through area of a preceding vehicle; detecting, within the see-through area, a next-to-last vehicle; determining at least one brake light of the next-to-last vehicle is present in the see-through area of the preceding vehicle; comparing a current intensity of the at least one visible brake light to a baseline intensity, wherein the baseline intensity is associated with a non-braking state; and upon the comparison indicating the at least one visible brake light indicates braking of the next-to-last vehicle, outputting an alert signal to energize an alerting component of the vehicle. Embodiments also include, a system to improve brake alerting using a camera coupled to a processor, comprising: means to identify a see-through area of a preceding vehicle; means to detect, within the see-through area, a next-to-last vehicle; means to determine at least one brake light of the next-to-last vehicle is present in the see-through area of the preceding vehicle; means to compare a current intensity of the at least one visible brake light to a baseline intensity, wherein the baseline intensity is associated with a non-braking state; and means to, upon the comparison indicating the at least one visible brake light indicates braking of the next-to-last vehicle, output an alert signal to energize an alerting component of the vehicle.

Embodiments also include a method to improve brake alerting using a camera coupled to a processor, comprising: identifying a see-through area of a preceding vehicle; detecting, within the see-through area, a next-to-last vehicle; determining that at least one brake light of the next-to-last vehicle is present in the see-through area of the preceding vehicle; observing the at least one brake light of the next-to-last vehicle; determining a state of the observed at least one visible brake light, wherein the state is one of braking, wherein the intensity of the at least one brake light indicating braking, or not braking, wherein the intensity of the at least one brake light indicating not braking; wherein observing further comprises a subsequent observing step; upon determining, from the subsequent observing step, that the state of the at least one visible brake light, has changed, outputting an alert signal to an alerting component of the vehicle. An alerting component may then be singled and, in response to the signal, energize/deenergize the alerting component.

Aspects of the above method and systems include wherein the processor determines the at least one visible brake light of the next-to-last vehicle is present in a see-through area of the preceding vehicle.

Aspects of the above method and systems include the vehicle of wherein: the processor determines the see-through area of the preceding vehicle by determining a polygon substantially overlaying the perimeter of the preceding vehicle; segmenting the polygon into an upper portion and a lower portion, wherein the upper portion and the lower portion each comprise substantially one half of the polygon and the segmentation is along a substantially horizontal line.

Aspects of the above method and systems include, wherein: the processor determines the see-through area of the preceding vehicle by determining a polygon substantially overlaying the perimeter of the preceding vehicle; and the processor further segments the polygon into an upper portion and a lower portion, wherein the upper portion comprises the portion of the polygon absent images of the preceding vehicle.

Aspects of the above method and systems include wherein the processor performs the comparison indicating that one of the at least one visible brake light indicates braking for a first period of time and does not indicate braking for a second period of time, wherein the first period of time and second period of time are substantially equal, outputting the alert signal only upon the comparison indicating that the one of the at least one visible brake light indicates braking for a third period of time greater than the first period of time.

Aspects of the above method and systems include, wherein upon the comparison indicates that the one of the at least one visible brake light indicates braking for a third period, and wherein the third period of time is greater than the first period of time, outputting the alert signal.

Aspects of the above method and systems include, the processor creating a profile of the next-to-last vehicle, wherein the profile comprises a relative position of a first brake light and second brake light within the image of the next-to-last vehicle; and the processor, based on the profile, determines the first brake light is obscured by the preceding vehicle and the second brake light indicates braking, outputting the alert signal.

Aspects of the above method and systems include, the processor creating a profile of the next-to-last vehicle, wherein the profile comprises a relative position of a first brake light and second brake light within the image of the next-to-last vehicle; and the processor, based on the profile, determines the first brake light is not obscured by the preceding vehicle the first brake light does not indicate braking and the second brake light indicates braking, omitting the outputting of the alert signal.

Aspects of the above method and systems include the processor creating a profile of the next-to-last vehicle, wherein the profile comprises a relative position of a first brake light and second brake light within the image of the next-to-last vehicle; and the processor, based on the profile, determines the first brake light is not obscured by the preceding vehicle the first brake light does not indicate braking and the second brake light indicates braking, outputting of the alert signal when the second brake like is the center high mounted stop light.

Aspects of the above method and systems include the processor further compares the current intensity and area of the at least one visible brake light to a baseline intensity and baseline area, wherein the baseline intensity and baseline area are each associated with a non-braking state.

Aspects of the above method and systems include the processor, in order to reduce false positives indicating the next-to-last vehicle is braking, profiles the preceding vehicle and excludes from processing any portion of the see-through area that coincides with the profile.

Aspects of the above method and systems include wherein the processor determines one the at least one visible brake light of the next-to-last vehicle is a center high mount stop light (CHMSL) of the next-to-last vehicle and indicates braking, outputting the alert signal.

Aspects of the above method and systems include wherein the processor omits outputting the alert signal when the processor determines the preceding vehicle is avoidable, if abruptly stopped, with the vehicle in a normal driving mode.

Aspects of the above method and systems include wherein the baseline intensity comprises an intensity, as observed by the camera within the red visible spectrum, during the non-braking activity.

Aspects of the above method and systems include further comprising capturing through one or more images of the next-to-last vehicle, a profile of the next-to-last vehicle comprising locations of the at least one brake light; and upon determining that at least a first portion of the at least one brake light indicates braking and at least a second portion of the at least one brake light does not indicate braking, and each of the at least one brake light of the second portion being determined to be obscured by a component of the preceding vehicle, outputting the alert signal.

Aspects of the above method and systems include wherein outputting of the alert signal is omitted upon determining the at least one visible brake light indicates braking in an intermittent pattern associated with a turn-signal.

Aspects of the above method and systems include wherein the current intensity the baseline intensity are luminosity intensities within the red visible spectrum.

Aspects of the above method and systems include wherein the intensity further comprises an intensity and an area within the red visible spectrum.

Aspects of the above method and systems include wherein the alert signal causes a change in an energization state of the alerting component Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle with enhanced collision avoidance features, comprising:
   a camera configured to capture real-time images ahead of a direction of travel of the vehicle and convert the real-time images into a corresponding output of electrical signals;
   a processor, receiving the output of electrical signals from the camera, and having a memory for storage of instructions for execution by the processor; and
   a communication interface enabling the processor to communicate with the camera and one or more other components of the vehicle;
   wherein the processor:
      determines that at least one visible brake light of a next-to-last vehicle is present in a see-through area of a preceding vehicle, wherein the at least one visible brake light is visible to the camera;
      compares a current intensity of the at least one visible brake light to a baseline intensity, wherein the baseline intensity is associated with a non-braking state; and
      upon the comparison indicating that the at least one visible brake light indicates braking of the next-to-last vehicle, outputs, on the communication interface, an alert signal energizing an alerting component of the vehicle.

2. The vehicle of claim 1, wherein the processor determines the at least one visible brake light of the next-to-last vehicle is present in a see-through area of the preceding vehicle.

3. The vehicle of claim 2, wherein:
   the processor determines the see-through area of the preceding vehicle by determining a polygon substantially overlaying a perimeter of the preceding vehicle;
   segmenting the polygon into an upper portion and a lower portion, wherein the upper portion and the lower portion each comprise substantially one half of the polygon and the segmentation is along a substantially horizontal line.

4. The vehicle of claim 2, wherein:
   the processor determines the see-through area of the preceding vehicle by determining a polygon substantially overlaying a perimeter of the preceding vehicle; and
   the processor further segments the polygon into an upper portion and a lower portion, wherein the upper portion comprises a portion of the polygon absent images of the preceding vehicle.

5. The vehicle of claim 1, wherein the processor performs the comparison indicating that one of the at least one visible brake light indicates braking for a first period of time and does not indicate braking for a second period of time, wherein the first period of time and second period of time are substantially equal, outputting the alert signal only upon the comparison indicating that the one of the at least one visible brake light indicates braking for a third period of time greater than the first period of time.

6. The vehicle of claim 5, wherein upon the comparison indicates that the one of the at least one visible brake light indicates braking for a third period, and wherein the third period of time is greater than the first period of time, outputting the alert signal.

7. The vehicle of claim 1, further comprising:
   the processor creating a profile of the next-to-last vehicle, wherein the profile comprises a relative position of a first brake light and second brake light within an image of the next-to-last vehicle; and the processor, based on the profile, determines the first brake light is obscured by the preceding vehicle and the second brake light indicates braking, outputting the alert signal.

8. The vehicle of claim 1, further comprising:

the processor creating a profile of the next-to-last vehicle, wherein the profile comprises a relative position of a first brake light and second brake light within an image of the next-to-last vehicle; and the processor, based on the profile, determines the first brake light is not obscured by the preceding vehicle the first brake light does not indicate braking and the second brake light indicates braking, omitting the outputting of the alert signal.

9. The vehicle of claim 1, further comprising:

the processor creating a profile of the next-to-last vehicle, wherein the profile comprises a relative position of a first brake light and second brake light within an image of the next-to-last vehicle; and the processor, based on the profile, determines the first brake light is not obscured by the preceding vehicle the first brake light does not indicate braking and the second brake light indicates braking, outputting of the alert signal when the second brake light is a center high mounted stop light.

10. The vehicle of claim 1, wherein the processor further compares the current intensity and area of the at least one visible brake light to a baseline intensity and baseline area, wherein the baseline intensity and baseline area are each associated with a non-braking state.

11. The vehicle of claim 1, wherein the processor, in order to reduce false positives indicating the next-to-last vehicle is braking, profiles the preceding vehicle and excludes from processing any portion of the see-through area that coincides with the profile.

12. The vehicle of claim 1, wherein the processor determines one the at least one visible brake light of the next-to-last vehicle is a center high mount stop light (CHMSL) of the next-to-last vehicle and indicates braking, outputting the alert signal.

13. The vehicle of claim 1, wherein the processor omits outputting the alert signal when the processor determines the preceding vehicle is avoidable, if abruptly stopped, with the vehicle in a normal driving mode.

14. The vehicle of claim 1, wherein the baseline intensity comprises an intensity, as observed by the camera within a red visible spectrum, during a non-braking activity.

15. A method for improved vehicle safety equalizing a camera capturing images in a direction-of-travel, wherein a processor coupled to the camera performs:

identifying a see-through area of a preceding vehicle;

detecting, within the see-through area, a next-to-last vehicle;

determining that at least one brake light of the next-to-last vehicle is visible in the see-through area of the preceding vehicle;

comparing a current intensity of the at least one visible brake light to a baseline intensity, wherein the baseline intensity is associated with a non-braking state; and upon the comparison indicating that the at least one visible brake light indicates braking of the next-to-last vehicle, outputting an alert signal to energize an alerting component of a vehicle.

16. The method of claim 15, further comprising:

capturing through one or more images of the next-to-last vehicle, a profile of the next-to-last vehicle comprising locations of the at least one brake light; and upon determining that at least a first portion of the at least one brake light indicates braking and at least a second portion of the at least one brake light does not indicate braking, and each of the at least one brake light of the second portion being determined to be obscured by a component of the preceding vehicle, outputting the alert signal.

17. The method of claim 15, wherein outputting of the alert signal is omitted upon determining the at least one visible brake light indicates braking in an intermittent pattern associated with a turn-signal.

18. The method of claim 15, wherein the current intensity the baseline intensity are luminosity intensities within a red visible spectrum.

19. A method to improve brake alerting of a vehicle using a camera coupled to a processor, comprising:

identifying a see-through area of a preceding vehicle;

detecting, within the see-through area, a next-to-last vehicle;

determining that at least one brake light of the next-to-last vehicle is visible in the see-through area of the preceding vehicle;

observing the at least one brake light of the next-to-last vehicle;

determining a state of the observed at least one visible brake light, wherein the state is one of braking, wherein an intensity of the at least one brake light indicates braking, or not braking, wherein the intensity of the at least one brake light indicates not braking;

wherein observing further comprises a subsequent observing step; and upon determining, from the subsequent observing step, that the state of the at least one visible brake light, has changed, outputting an alert signal to an alerting component of the vehicle.

20. The method of claim 19, wherein the alert signal causes a change in an energization state of the alerting component.

* * * * *